June 19, 1956  G. K. REEN ET AL  2,751,512
HIGH FREQUENCY VIBRATION EXCITER AND CALIBRATOR
Filed Feb. 9, 1953  2 Sheets-Sheet 1
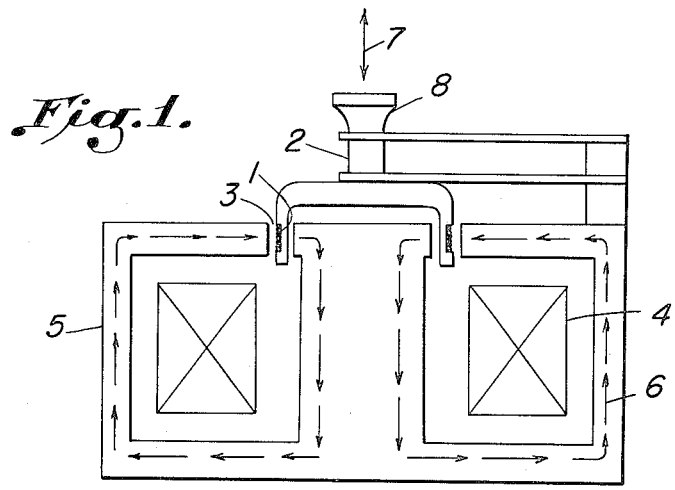
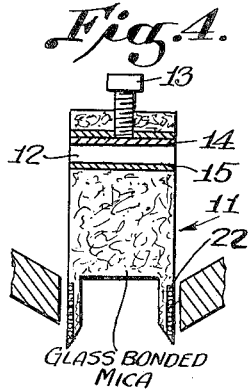
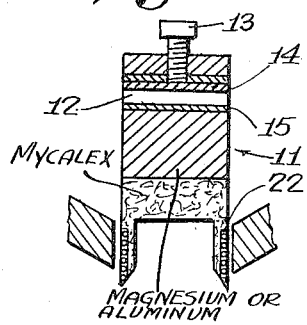
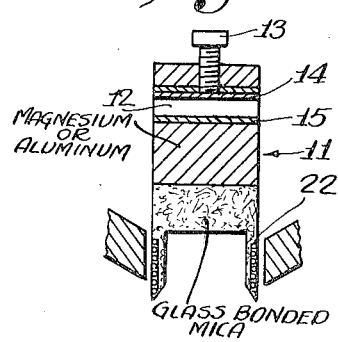
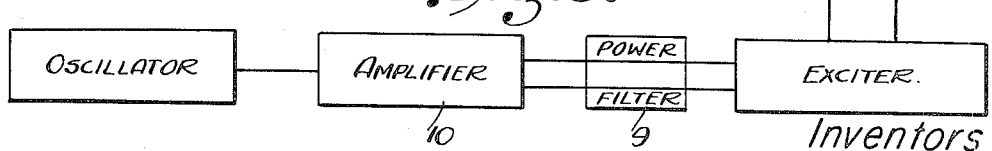
Inventors
Gerald K. Reen
Galt B. Booth
By their attorneys
Howson and Howson

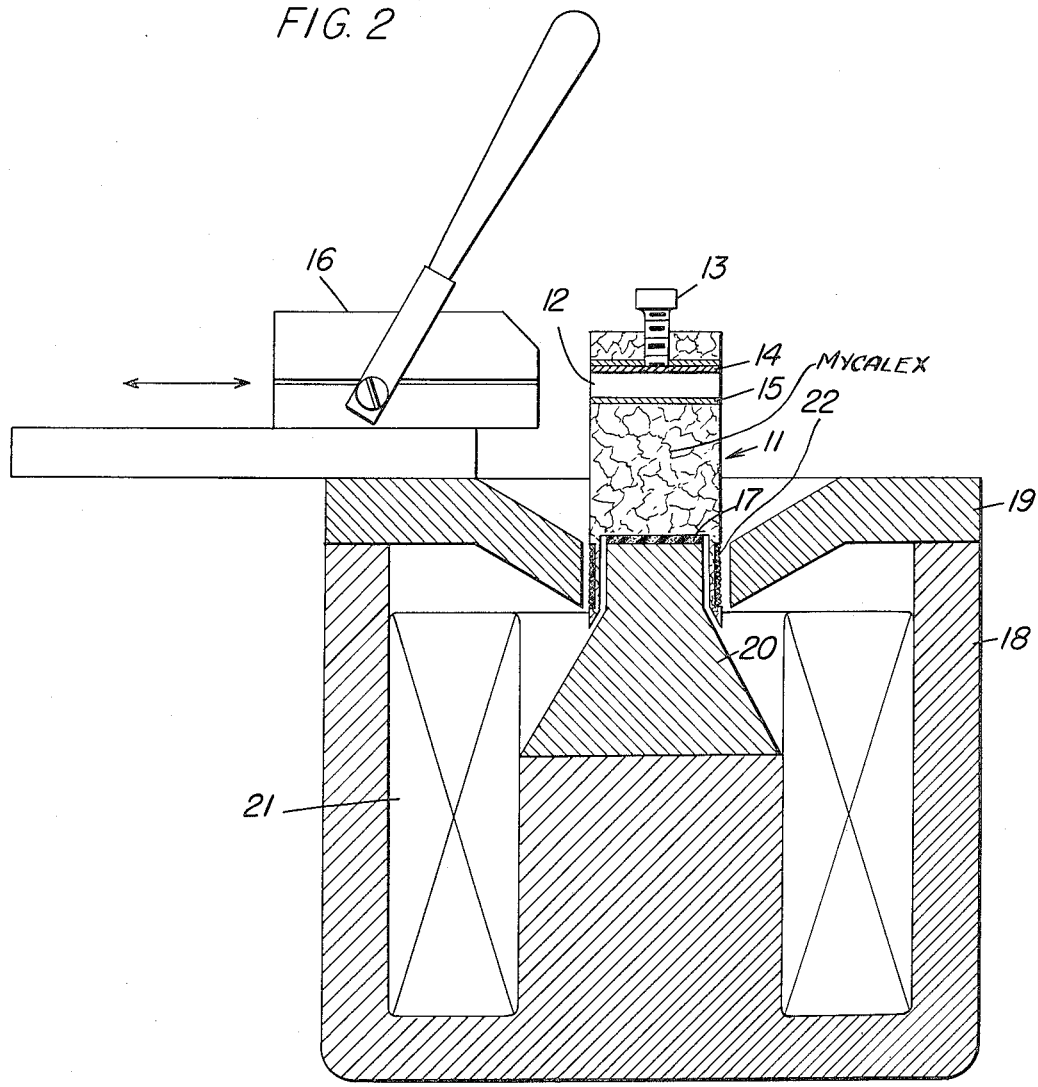

United States Patent Office 2,751,512
Patented June 19, 1956

2,751,512

HIGH FREQUENCY VIBRATION EXCITER AND CALIBRATOR

Gerald K. Reen and Galt B. Booth, New Haven, Conn., assignors, by mesne assignments, to Textron American, Inc., Providence, R. I., a corporation of Rhode Island Application February 9, 1953, Serial No. 335,764

8 Claims. (Cl. 310—27)

This invention relates to a device hereinafter called an electromagnetic vibration exciter, for converting electric energy into mechanical vibrations, and in particular to the moving element or driver.

A vibration exciter of common form is shown in Fig. 1 of the drawings. The force generated by such a vibration exciter is derived from an electric current flowing in a driver coil 1 mounted on a driver element 2 which is positioned in an air gap 3 of high magnetic flux density. The high magnetic flux density is obtained by connecting a stationary field coil 4 to a suitable D. C. voltage. There is a magnetic structure 5 associated with the field coil 4 which offers a continuous path of low resistance to the resultant magnetic flux 6 except for the region occupied by the driver coil. Due to the shape of the magnetic structure, most of the flux set up in the magnetic structure is forced to cross the air gap and thereby crosses the wires of the driver coil. With this arrangement, the direction of the generated force is as indicated in Fig. 1 by the arrows 7. It may be reversed by reversing the direction of the current in the driver coil. The magnitude of the generated force is proportional at any instant to the value of current flowing in the driver coil, the flux density in the air gap and length of conductor. If the magnetic structure is of adequate size and maintains a constant uniform flux density independent of the current in the driver coil, then the generated force is proportional to the current in the driver coil. Furthermore, the generated force is independent of the motion of the driver and is dependent only on the value of current in the driver coil. The force generated in the driver coil is coupled by the driver to a table 8 to which the specimen to be vibrated is attached. The assembly of the driver coil, the driver element, and the table is referred to as the moving element or driver.

The normal application of the above described vibration exciter in any of its commercially available forms is as a test instrument in the field of vibration analysis of structures or mechanisms. The main requirements of the exciter are:

(1) That it be capable of generating a force at the table which varies sinusoidally with time with a minimum of distortion;

(2) That this sinusoidal force can be generated over a wide range of frequencies;

(3) That it is desirable and in some applications necessary that this force generated at the table surface be a reasonably linear function of the alternating current flowing in the driver coil and independent of the frequency of the current.

It can be shown by the fundamental laws of electricity and magnetism that the force exerted on the driver coil in the air gap is at any instant proportional to the current in the coil if the flux density is constant. If the driver element which connects the driver coil to the table can be considered a perfectly rigid member, then the force at the table is an exact reproduction of the force generated in the driver coil which in turn is a function of the driver coil current. From the above discussion it can be seen that the relationship between driver coil current and table force will be constant at any frequency at which the driver element can be considered perfectly rigid, and the table force will be purely sinusoidal at any frequency at which a purely sinusoidal current can be forced to flow in the driver coil. These two requirements, namely, a rigid driver element, and a purely sinusoidal current, are the limitations on the frequency range of the exciter.

It is the purpose of this invention to provide a vibration exciter which will generate relatively pure sinusoidal forces over a considerably wider frequency range than has previously been possible. It is also the purpose of this invention to provide a vibration exciter and power supply combination which will generate sinusoidal forces of constant vector amplitude for constant input signals to the power supply, independent of frequency over a wider frequency range. The ratio of the acceleration of the driver to the input signals to the amplifier will be defined as the gain of the combination. The need for higher frequency force generators is commonly accepted in the field of vibration analysis and is evidenced by the demands of the guided missiles and rocket design groups. The need for the high frequency, constant power supply and vibration exciter combination, lies in two fields:

(a) Calibration of small high frequency vibration pickups wherein the magnitude of the input signal to the power supply can be used as a measurement of the force generated at the table;

(b) In the field of vibration analysis where it is desired to scan the frequency spectrum without interruption to adjust the gain of the system. A typical example of this application is in the field of production testing of electronic tubes. Here a multi-frequency signal source, such as a noise generator, is used to drive the power amplifier and vibration exciter. Under these conditions, it is imperative that the exciter and amplifier combination have a constant gain characteristic independent of frequency, in order that the force exerted by the driver element on the electronic tube be an exact reproduction of the signal originating in the noise generator. If the gain of the combined amplifier and exciter varied erratically with frequency, then the wave shape of the force output of the exciter would be severely distorted when compared with the signal originating in the noise generator.

In describing the manner in which the invention accomplishes the aforesaid purposes, reference is made to the accompanying drawings which embody the preferred form of the invention.

Fig. 1 is a schematic diagram of a typical exciter of the prior art.

Fig. 2 is a cross-section of the assembled driver coil, driver element and table, suspended in the air gap of the associated magnet structure.

Fig. 3 is a diagram of the arrangement of the exciter, amplifier and power filter.

Fig. 4 is a fragmentary view showing the driver and the ends of the poles of a construction in which the driver is made of glass bonded mica.

Fig. 5 is a view similar to Fig. 4 of a modification in which part of the driver is made of Mycalex and part of magnesium or aluminum.

Fig. 6 is a view similar to Fig. 5 in which the portion of the driver in the air gap is made of glass bonded mica.

As discussed previously, the upper frequency limit of the exciter is restricted by the lack of rigidity of the driver 2 at high frequencies. At some frequency the driver vibrates longitudinally at its first natural mode of vibration. At this frequency the force transmitted from the driver coil to the specimen is magnified many times, depending upon the damping of the material of the driver. At frequencies above this resonant point there is a smooth decline in transmitted force and the driver eventually acts as an isolator and the transmitted force is attenuated. Below the resonant point there is a smooth rise in response up to the point of resonance. The curves of transmissibility are available in any text on vibration.

In addition to the longitudinal mode of vibration the driver will vibrate in some complex mode in the thin walled cup section on which the coil is wound. It can be seen that both of these natural modes of vibration must be at frequencies above the operating range of the exciter. Further consideration will show that the increased transmissibility of the driver at resonance imposes more limitations on the amplifier-vibrator system at frequencies as low as one third that of the resonant frequency. Let it be assumed that the force build-up in the driver at resonance is of the order of 50 to 1, and the resonant frequency is 21,000 C. P. S. If the power amplifier driving the exciter is tuned to 7,000 C. P. S. and there is 1% 3rd harmonic distortion in the amplifier output, then the force generated in the driver coil will consist of a component at 7,000 C. P. S. and 1% of that component at 21,000 C. P. S. However, the force transmitted to the specimen will be magnified 50 times at 21,000 C. P. S. In other words, the force output will have 50% 3rd harmonic distortion, which is unacceptable. Since the driver coil presents an inductive load to the amplifier which is conducive to distortion, it is extremely difficult to reduce the harmonic distortion of the amplifier to the point where the above effect is negligible. Consequently, it can be seen that the resonant frequencies of the driver must be at the highest frequency possible. In addition, we can use a special power filter 9 between the power amplifier 10 and the driver coil which attenuates all of the higher harmonics in the amplifier output. To summarize, it may be said that in order to obtain the highest usable frequency response from a power supply and exciter combination it is necessary to have:

(a) An extremely low distortion power amplifier designed to drive the exciter;

(b) A special high power capacity filter between the amplifier and driver coil to attenuate harmonics;

(c) A driver element so designed as to have all resonant frequencies at the highest possible frequency.

We have found on further consideration of item (c) above that the resonant frequencies of the driver element are a function of the shape of the element, the modulus of elasticity of the material, and an inverse function of the weight of the material used. The section of the driver element within the air gap must be an insulator to minimize eddy currents. Therefore, the driver must be a non-conducting material with a maximum stiffness to weight ratio. In addition it must have a reasonably low density and preferably be machinable. This invention embodies the use of such a material in the form of Mycalex 400, a machinable glass-bonded mica compound. This material is commonly used as an insulator. Mycalex and Mycalex 400 are materials well known and fully defined in literature. They are sold by Mycalex Corporation of America and those authorized by that company. However, the combined use of its insulating property with its high stiffness to weight ratio is unique in the field of vibration exciter design. The material most commonly used for the construction of driver elements of the size described herein is linen base phenolic bonded laminates. The stiffness to weight ratio of the laminates is approximately ⅓ that of Mycalex. There are other insulators with about the same properties as Mycalex but they are not machinable. However, there is a disadvantage to Mycalex in that its weight is about 3 times that of the laminates.

From the fundamental laws of mechanics it can be shown that the acceleration of a spring mass system, such as the described driver element and suspending structure, will be practically directly proportional to the generated force and inversely proportional to the weight of the driver element and attached specimen at frequencies well above the natural frequency of the driver element on its suspension. Since practical applications require the generation of a given acceleration of the specimen it is seen that the specimen weight is limited by the weight of the driver element and the generated force. Mathematically $$F \approx (W_d + W_s)(a)$$

where:

$F$ = generated force
$W_d$ = weight of the driver
$W_s$ = weight of the specimen
$a$ = acceleration in "g," where "g" equals 386 inches per sec.$^2$ Therefore, in the design of an exciter it is necessary to obtain the maximum possible generated force with the minimum weight of driver element. However, as previously discussed, the size and shape of the driver element are determined by the desired high frequency response of the exciter. In addition the material and therefore the weight of the driver element are determined by this high frequency requirement.

As pointed out, the weight of Mycalex is three times that of materials previously used. The common application of an exciter of this type is in the field of accelerometer calibration or vibration of small electronic components such as vacuum tubes. The weight of these specimens is negligible with respect to the weight of the driver. Therefore, the generated force needs to be increased approximately three times with the Mycalex driver or the weight of the driver needs to be decreased proportionately.

Mathematically, it can be shown that the acceleration of the driver is independent of the diameter of the driver so long as the weight is very much greater than that of the specimen and the driver height is maintained constant. This statement involves consideration of maximum power dissipating ability of the driver coil surface and the magnetic saturation properties of the magnet structure. Therefore, within the weight limitations as discussed, the diameter of the driver element can be varied over a wide range while maintaining constant acceleration output.

We have found by considering the dynamic properties of various diameter drivers that the rigidity of the smaller diameter coils is materially better than that of the larger. This means that the longitudinal natural frequency and other resonant modes of the driver will occur at higher frequencies. Considering the cup section of the driver, the thin wall sections are considerably more rigid with a small radius of curvature. In addition, the length of the thin wall section of the driver on which the driver coil is wound must be decreased in proportion to the decrease in diameter of the coil in order that the flux density in the air gap does not decrease. This lends further rigidity to this section of the driver. Because of this increased rigidity we have found that we can decrease the overall height of the driver at the same rate as we decrease the diameter of the driver. This results in a net increase in the acceleration level obtainable at the specimen. In order to obtain the same acceleration from a Mycalex driver as from a laminated plastic driver and not affect the stiffness of the driver, it would be necessary to decrease the diameter and height of the driver by a factor of 3. Such a reduction in diameter would not be possible in most cases since the weight of the specimen would become appreciable at this point. Therefore, other means of increasing the force generated by the driver coil are necessary.

Mathematically, the force generated by the current flowing in the driver coil can be expressed by the equation:

$$F = BLI$$

where
$B$ = the flux density in the air gap
$L$ = length of the conductor in the air gap
$I$ = the current flowing in the driver coil.

The length of the conductor and driver coil current are limited by power dissipating and magnetic circuit considerations. Therefore, in order to increase the generated force, the flux density must be increased. The limitation point on the flux density obtainable is the point at which the pole section magnetic structure reaches saturation. Some of the available flux by-passes the air gap. This is referred to as leakage flux and must pass through the center pole of the exciter. Therefore, the shapes of the center pole and the cover have been modified to reduce the effect of this leakage flux to a minimum. In addition, the center pole of the exciter has been constructed of a material with extremely high saturation properties. The combination of the decrease in diameter and height of the driver and the increase of flux density in the air gap has enabled us to obtain the required acceleration of the driver.

We will now describe the preferred embodiment of the invention which is shown in Fig. 2.

This particular embodiment of the invention has been specifically designed to vibrate sub-miniature vacuum tubes. The driver 11 is of one piece construction, and provision is made for mounting the sub-miniature tube in a horizontal hole 12 within the driver. The specimen is clamped rigidly by a thumb screw 13 and a clamp pad 14. A steel sleeve 15 is pressed in the driver to magnetically shield the tube. This shield is a press fit in the driver and in this manner is held in intimate contact with the driver. The overall assembly of the driver, clamp pad, shield, and thumb screw provides a continuous rigid means of holding the specimen. A tube lead clamp 16 is provided to furnish electrical contact to the tube elements while being vibrated. In order that the horizontal hole in the driver could be used as a clamping means for the tube, this tube lead clamp has been made retractable to allow insertion of the tube leads before clamping of the tube. The driver is supported on a resilient rubber pad 17 on the pole piece. The magnet structure consists of an exciter body 18, top cover 19, and center pole piece 20. The magnetic flux is generated by the current flowing in a D. C. field coil 21 and there is a driver coil 22 on the lower or cup end of the driver, as usual.

One problem with previously available exciters designed for the same purpose was that the tube was held in the driver by a flexible clamp. We have found that the clamping mechanism must necessarily have a maximum rigidity. By making the upper section of the clamp, namely, the thumb screw or screws, bear directly on the main section of the driver, we have obtained the rigidity required. This general form of clamp construction requires that the main body of the driver totally surrounds the specimen. In this manner, a minimum of flexible joints between the clamp and main section of the driver is obtained and resonant modes in which the specimen and clamp vibrate in relation to the driver are eliminated.

The driver is constructed of Mycalex 400, which has been described previously. Its stiffness to weight ratio is approximately three times that of the plastic laminates previously used. This ratio is superior in that it theoretically places the natural resonant frequencies of the driver at a frequency 1.7 times that of the previously used plastic laminates. The use of this material therefore allows operation at frequencies appreciably higher than obtainable before. Similarly, the diameter and height of the driver have been reduced. This was done to improve the dynamic stiffness of the cup section of the driver and at the same time increase the longitudinal resonant frequency of the driver. In addition, the weight of the driver was reduced by these reductions in dimensions. The net result of the reduced size of the driver was higher frequency response and some gain in acceleration obtainable.

The portion of the driver outside of the air gap does not necessarily need to be a non-conductor. Since certain materials such as magnesium and aluminum have a higher stiffness to weight ratio than most non-conductors, it is, in some applications, advantageous to make the portion of the driver outside the air gap of such conducting material.

However, it was still necessary to increase the force generated in the driver coil in order to compensate for the additional weight of the Mycalex 400 driver. This was accomplished by increasing the flux density in the air gap by the use of a material in the pole piece of a high magnetic saturation. Also, the pole piece and cover have been shaped to reduce the effects of the leakage flux past the air gap and to force saturation of the pole piece to occur at a more optimum point.

The portion of the driver element moving in the gap of the structure may be of any rigid insulating ceramic material, ceramic material being defined as one having an inorganic base which is heat-treated during its manufacture or subsequent use by firing, calcining, sintering or fusion of at least a portion of the inorganic material. The ceramics used in this invention should have a high stiffness-to-weight ratio, since high frequency response is desired.

What we claim is:

1. A vibration exciter having a stationary magnetic structure and a driver element adapted to move in a gap in that structure, said driver element being formed of glass-bonded mica.

2. A vibration exciter having a stationary magnetic structure and a driver element adapted to move in a gap in that structure, said driver element being formed of Mycalex.

3. A vibration exciter having a stationary magnetic structure and a driver element adapted to move in a gap in that structure, said driver element being formed of Mycalex 400.

4. A vibration exciter having a stationary magnetic structure and a driver element adapted to move in a gap in that structure, said driver element being formed of glass.

5. A vibration exciter having a stationary magnetic structure and a driver element adapted to move in a gap in that structure, said driver element being formed of rigid insulating ceramic material having a high stiffness-to-weight ratio.

6. A vibration exciter according to claim 1 in which the driver has a portion formed of Mycalex located in the air gap, in combination with an upper portion constructed of magnesium attached to the air gap portion; whereby the dynamic properties of the driver are improved.

7. A vibration exciter according to claim 1 in which the driver has a portion formed by glass bonded mica located in the air gap, in combination with an upper portion constructed of magnesium bonded to the Mycalex portion; whereby the dynamic properties of the driver are improved.

8. A vibration exciter comprising a stationary magnetic pole, a stationary magnetic body having a base, a stationary magnetic cover, and an air gap between said cover and said pole, the stationary magnetic pole conically increasing in diameter from the air gap toward the base of said stationary magnetic body, in combination with a driver extending into the air gap, said cover being conically depressed toward the pole, whereby the flux density in the air gap is increased over that when the cover is flat, and the performance is improved.

References Cited in the file of this patent

UNITED STATES PATENTS

| | | |
|---|---|---|
| 1,105,924 | Pridham et al. | Aug. 4, 1914 |
| 1,980,957 | Parry | Nov. 13, 1934 |
| 2,299,424 | Peters | Oct. 20, 1942 |
| 2,300,926 | Hutcheson | Nov. 3, 1942 |
| 2,336,930 | Dyer | Dec. 14, 1943 |
| 2,345,022 | Williamson | Mar. 28, 1944 |
| 2,487,029 | Piety | Nov. 1, 1949 |
| 2,557,080 | Dawson | June 19, 1951 |
| 2,590,554 | Lukacs | Mar. 25, 1952 |